(12) United States Patent
Yoshida

(10) Patent No.: US 6,948,025 B2
(45) Date of Patent: Sep. 20, 2005

(54) SYSTEM AND METHOD FOR TRANSFERRING DATA BETWEEN AN IEEE 1394 DEVICE AND A SCSI DEVICE

(75) Inventor: Yuji Yoshida, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 10/211,290

(22) Filed: Aug. 5, 2002

(65) Prior Publication Data

US 2003/0145150 A1 Jul. 31, 2003

(30) Foreign Application Priority Data

Jan. 31, 2002 (JP) ........................................ 2002-022843

(51) Int. Cl.⁷ .............................................. G06F 13/14
(52) U.S. Cl. ........................ 710/315; 710/22; 710/38; 710/72; 710/105; 710/313; 710/316
(58) Field of Search ................................ 710/305–317, 710/105–106, 62–65, 72, 36–39, 22–31, 300–301, 311–215

(56) References Cited

U.S. PATENT DOCUMENTS

| | | | | | |
|---|---|---|---|---|---|
| 5,491,812 A | * | 2/1996 | Pisello et al. | ................ | 709/236 |
| 5,748,924 A | * | 5/1998 | Llorens et al. | ................ | 710/62 |
| 5,818,029 A | * | 10/1998 | Thomson | ................ | 235/486 |
| 6,115,771 A | * | 9/2000 | Born | ................ | 710/315 |
| 6,445,718 B1 | * | 9/2002 | Muto | ................ | 370/474 |
| 6,553,440 B1 | * | 4/2003 | Ikegaya | ................ | 710/62 |
| 6,725,413 B1 | * | 4/2004 | Ishida | ................ | 714/758 |

FOREIGN PATENT DOCUMENTS

JP          2000-196605          7/2000

* cited by examiner

Primary Examiner—Paul R. Myers
Assistant Examiner—Raymond N Phan
(74) Attorney, Agent, or Firm—Staas & Halsey LLP

(57) ABSTRACT

An interface conversion system for improving the performance of a data transfer process that is performed between the IEEE 1394 interface and a SCSI. Data is transferred between a host device that complies with the IEEE 1394 protocol and a SCSI device that complies with the SCSI protocol. The interface conversion system includes an IEEE 1394 interface circuit connected to the host device, a SCSI circuit connected to the SCSI device, and a data converter. The data converter is connected to the IEEE 1394 interface circuit and the SCSI circuit to control the transfer of data between the host device and the SCSI device. The data converter includes a control circuit for independently controlling the IEEE 1394 protocol and the SCSI protocol.

2 Claims, 13 Drawing Sheets

SYSTEM AND METHOD FOR TRANSFERRING DATA BETWEEN AN IEEE 1394 DEVICE AND A SCSI DEVICE

This application is based upon and claims priority of Japanese Patent Applications No. 2002-22843, filed on Jan. 31, 2002, the contents being incorporated herein by reference.

FIELD OF THE INVENTION

The present invention relates to an interface conversion system, and more particularly, to an interface conversion system used to transfer data between a device having an interface that complies with the IEEE 1394 standard and a device having an interface that complies with the small computer system interface (SCSI) protocol.

BACKGROUND OF THE INVENTION

In recent years, the number of devices provided with an interface that complies with the IEEE 1394 protocol, which is a high speed serial bus interface protocol, has been increasing year by year. The IEEE 1394 interface enables the connection and removal of a bus in a state when the power source is activated. A SCSI, which complies with a high speed interface protocol, is used to connect a computer to peripheral devices. The SCSI is widely used in peripheral devices of personal computers, such as hard disk drives and CD-ROM drive scanners.

To connect a device provided with a SCSI to a host PC, which runs on an OS such as Windows and has an IEEE 1394 interface, an interface converter, which converts data, is necessary for communication between different interfaces.

Referring to FIG. 1, a prior art interface converter 50, which is used between an IEEE 1394 interface and a SCSI, includes a data converter 1, an IEEE 1394 interface circuit 2, and a SCSI circuit 3. The IEEE 1394 interface circuit 2 is connected to a host PC 4, and the SCSI circuit 3 is connected to a SCSI device 5.

The IEEE 1394 interface employs a protocol referred to as SBP2 (SCSI-3 serial bus protocol 2), which is based on the SCSI protocol. Thus, the procedure for processing data and the contents of the data are similar in the SCSI and SBP2 protocols. Accordingly, the interface converter 50 performs simple conversion of data formats and transfers data between the IEEE 1394 interface and the SCSI.

Referring to FIG. 2, the IEEE 1394 interface circuit 2 and the SCSI circuit 3 both perform a command fetch process (step 1), a data transfer process based on the fetched command (step 2), and a status notification process (step 3), which is performed after the data transfer process.

More specifically, referring to FIG. 5, the IEEE 1394 interface circuit 2 repeats a process for retrieving a command operation request block (ORB) from the host PC, which operates in accordance with the IEEE 1394 protocol, a process for transferring data in accordance with the command ORB, and a process for notifying the status after the data transfer.

The SCSI circuit 3 repeats a CMD phase, which corresponds with the command ORB retrieving operation, a data IN/OUT phase, which corresponds with the data transfer operation, a status phase, which corresponds with the status notification operation, and a message phase.

The command ORB is a packet format, which carries out a command, and as shown in FIG. 3, includes a data section and a command block section. The data section includes various data sections, such as those for data volume, transfer speed, page size, and data size. An execution command that is actually executed is written to the command block section.

The content of a command block is the same as that of the command sent to the SCSI device 5. Therefore, when the interface converter 50 receives the command ORB, the data converter 1 extracts the command block section and transfers the command block section to the SCSI device 5.

In the data transfer process that follows the command ORB retrieving process, the data converter 1 transfers the data received from the host PC 4 or from the SCSI device 5 to the SCSI device 5 or the host PC 4 in accordance with the execution command without processing the received data.

In the status notification process, when the interface converter 50 receives a status and message notification of the execution command from the SCSI device 5, the interface converter 50 associates the content of the notification with a status FIFO format of the IEEE 1394 interface and transfers the notification to the host PC 4.

More specifically, referring to FIG. 4, the interface converter 50 transfers the contents of the status and message notification to a command set-dependent section, which is in the status FIFO format. In the host PC 4, a driver, which runs on an OS such as Windows, operates to control the SPB2 protocol. A single driver controls every SPB2 compatible IEEE 1394 device that is connected to the driver.

Accordingly, the timing for starting the output of a command or data to the SCSI device 5 or the timing for starting error processing changes in accordance with the operating state of the host PC 4.

The prior art interface converter 50 has the shortcomings described below.

(1) When a command or data is transferred from the host PC 4 to the SCSI device 5 and if the IEEE 1394 interface side is functioning normally but an error occurs in the SCSI side, the converter must send an error notification to the host PC 4.

(2) When a command or data is transferred from the SCSI device 5 to the host PC 4 and if the SCSI side is functioning normally but an error occurs in the IEEE 1394 interface side, the converter 50 must send an error notification to the host PC 4.

(3) When an error occurs, the converter 50 waits for an instruction from the host PC 4 before performing a recovery process. Thus, it takes time until the recovery is completed. When an error occurs during the transfer of data, the data transfer rate decreases. This lowers the performance of the system.

(4) When an error occurs in the IEEE 1394 interface side or the SCSI side, the converter 50 must retry data transfer from the beginning.

(5) When the timing for starting the CMD phase, the data IN/OUT phase, and the status phase in the SCSI device 5 significantly differs from the timing for starting the command ORB retrieving process, the data transfer process, and the status notification process in the host PC 4, the host PC 4 determines that an error occurred in the SCSI even though there is no error. As a result, the recovery process is performed.

SUMMARY OF THE INVENTION

It is an object of the present invention to provide an interface conversion system or converter for improving the performance of a data transfer process that is performed between the IEEE 1394 interface and a SCSI.

To achieve the above object, the present invention provides an interface conversion system for performing a data conversion process. Data is transferred between a host device that complies with the IEEE 1394 protocol and a SCSI device that complies with the SCSI protocol. The interface conversion system includes an IEEE 1394 interface circuit connected to the host device, a SCSI circuit connected to the SCSI device, and a data converter. The data converter is connected to the IEEE 1394 interface circuit and the SCSI circuit to control the transfer of data between the host device and the SCSI device. The data converter includes a control circuit for independently controlling the IEEE 1394 protocol and the SCSI protocol.

A further perspective of the present invention is an interface conversion system for performing a data conversion process. Data is transferred between a host device that complies with the IEEE 1394 protocol and a SCSI device that complies with the SCSI protocol. The SCSI device has a bus free phase. The interface conversion system includes an IEEE 1394 interface circuit connected to the host device, a SCSI circuit connected to the SCSI device, and a data converter. The data converter is connected to the IEEE 1394 interface circuit and the SCSI circuit for controlling the transfer of data between the host device and the SCSI device. The data converter includes a control circuit for independently controlling the IEEE 1394 protocol and the SCSI protocol. The control circuit includes a DMA controller, a central processor, and a memory. The DMA controller is connected to the IEEE 1394 interface circuit and the SCSI circuit, for transferring the data between the IEEE 1394 interface circuit and the SCSI circuit. The central processor is connected to the IEEE 1394 interface circuit, the SCSI circuit, and the DMA controller, for controlling the IEEE 1394 interface circuit, the SCSI circuit, and the DMA controller. The memory is connected to the central processor, for storing the data. The central processor includes a first processor, a second processor, a third processor, and a fourth processor. The first processor re-transfers data related with a data error to the host device or the SCSI device without notifying the host device of the occurrence of the data error when the data error occurs in the IEEE 1394 interface circuit. The second processor re-transfers data related with a data error to the host device or the SCSI device without notifying the host device of the occurrence of the data error when the data error occurs in the SCSI circuit. The third processor sets the SCSI device to the bus free phase without resetting the SCSI device when receiving a reset request from the host device. The fourth processor divides a command received from the host device into a plurality of divided commands and provides the divided commands to the SCSI device.

A further perspective of the present invention is a method for transferring data between a host device connected to the IEEE 1394 interface and a SCSI device connected to the SCSI. The method includes the steps of transferring the data from the host device to the SCSI device or from the SCSI device to the host device, and re-transferring the data related with a data error from the SCSI device to the host device or from the host device to the SCSI device without notifying the host device of the occurrence of the data error when the data error occurs in the IEEE 1394 interface during the step of transferring the data.

A further perspective of the present invention is a method for transferring data between a host device connected to the IEEE 1394 interface and a SCSI device connected to the SCSI. The method includes the steps of transferring the data from the host device to the SCSI device or from the SCSI device to the host device, and re-transferring the data related with a data error from the SCSI device to the host device or from the host device to the SCSI device without notifying the host device of the occurrence of the data error when the data error occurs in the SCSI during the step of transferring the data.

A further perspective of the present invention is a method for transferring data between a host device connected to the IEEE 1394 interface and a SCSI device connected to the SCSI. The method includes comprising the steps of transferring the data from the host device to the SCSI device or from the SCSI device to the host device, and re-transferring the data related with a data error from the SCSI device to the host device or from the host device to the SCSI device without resetting the SCSI device when the error occurs in the IEEE 1394 interface during the step of transferring the data.

A further perspective of the present invention is a method for transferring data between a host device connected to the IEEE 1394 interface and a SCSI device connected to the SCSI. The method includes the steps of transferring the data from the host device to the SCSI device or from the SCSI device to the host device, and re-transferring the data related with a data error from the SCSI device to the host device or from the host device to the SCSI device without resetting the SCSI device when the data error occurs in the SCSI in the step of transferring the data.

A further perspective of the present invention is a method for transferring data between a host device connected to the IEEE 1394 interface and a SCSI device connected to the SCSI. The SCSI device has a bus free phase. The method includes the steps of generating a reset request for resetting the SCSI device using the host device, and setting the SCSI device to the bus free phase in accordance with the reset request without resetting the SCSI device.

A further perspective of the present invention is a method for transferring data between a host device connected to the IEEE 1394 interface and a SCSI device connected to the SCSI. The method includes the steps of generating a command for transferring data from the host device to the SCSI device using the host device, dividing the command into a plurality of commands, and providing the divided commands to the SCSI device.

A further perspective of the present invention is a method for transferring data between a host device connected to the IEEE 1394 interface and a SCSI device connected to the SCSI. The SCSI device has a data phase. The method includes the steps of reading data from the host device, transferring the read data to the SCSI device, and storing the read data in a memory when a command is generated by the host device in the step of transferring the read data until the SCSI device enters the data phase that receives and transmits the data.

A further perspective of the present invention is a method for transferring data between a host device connected to the IEEE 1394 interface and a SCSI device connected to the SCSI. The method includes the steps of reading data from the host device, transferring the read data to the SCSI device, nullifying a packet including a data error when the data error occurs in the IEEE 1394 interface circuit, reading the read data again, and re-transferring the read data to the SCSI device.

A further perspective of the present invention is a method for transferring data between a host device connected to the IEEE 1394 interface and a SCSI device connected to the SCSI. The method includes the steps of transferring the data from the SCSI device to the host device, and re-transferring the same data as the data of a packet, in which a data error occurred, to the host device when the data error occurs in the IEEE 1394 interface circuit in the step of transferring the data.

A further perspective of the present invention is a method for transferring data between a host device connected to the IEEE 1394 interface and a SCSI device connected to the SCSI. The method includes the steps of transferring the data from the host device to the SCSI device, generating an execution command again related with the data transfer without notifying the host device of the occurrence of the data error when the data error occurs in the SCSI during the step of transferring the data, providing the generated execution command to the SCSI device, and starting the transfer of data from the beginning in accordance with the generated execution command.

A further perspective of the present invention is a method for transferring data between a host device connected to the IEEE 1394 interface and a SCSI device connected to the SCSI in accordance with a predetermined execution command. The SCSI has a message OUT phase and a bus free phase. The method includes the steps of transferring the data from the SCSI device to the host device, asserting an attention signal when the data error occurs in the SCSI during the step of transferring the data, providing the attention signal to the SCSI device, performing a padding transfer in accordance with the attention signal by the SCSI device, causing the SCSI device to enter the message OUT phase, generating an abort signal for causing the SCSI device to enter the bus free phase and providing the abort signal to the SCSI device, providing an execution command related with the data error to the SCSI device again, and starting the transfer of data related with the execution command from the beginning.

A further perspective of the present invention is a method for transferring data between a host device connected to the IEEE 1394 interface and a SCSI device connected to the SCSI in accordance with a predetermined execution command. The SCSI has a message OUT phase and a bus free phase. The method includes the steps of transferring the data from the host device to the SCSI device, asserting an attention signal when a reset request for resetting the SCSI device is generated by the host device, providing the attention signal to the SCSI device, performing a padding transfer to the SCSI device, causing the SCSI device to enter the message OUT phase, generating a abort signal for causing the SCSI device to enter the bus free phase and providing the abort signal to the SCSI device, and causing the SCSI device to return to a normal operation without resetting the SCSI device.

A further perspective of the present invention is an interface converter for performing a data conversion process. Data is transferred between a host device that complies with the IEEE 1394 protocol and a SCSI device that complies with the SCSI protocol. The interface converter includes an IEEE 1394 interface circuit connected to the host device, a SCSI circuit connected to the SCSI device, and a data converter. The data converter is connected to the IEEE 1394 interface circuit and the SCSI circuit to control the transfer of data between the host device and the SCSI device. The data converter includes a control circuit for independently controlling the IEEE 1394 protocol and the SCSI protocol.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 6:
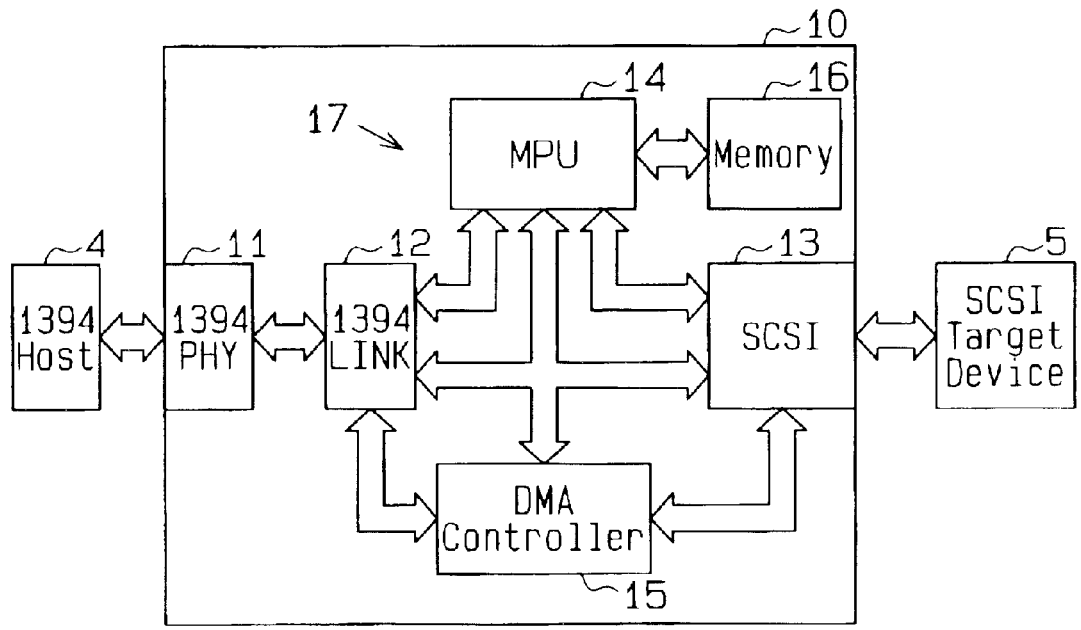
FIG. 6 is a schematic block diagram of an interface converter according to a preferred embodiment of the present invention.

FIG. 6 is a schematic block diagram of an interface conversion system (interface converter) 10 according to a preferred embodiment of the present invention. The interface converter 10 includes an IEEE 1394 interface circuit, a data converter (control circuit) 17, and a SCSI circuit 13.

The IEEE 1394 interface circuit includes a 1394 PHY 11 and a 1394 LINK 12. The 1394 PHY 11 includes a physical layer function for connection with a 1394 host PC (host device) 4. Further, the 1394 PHY 11 is connected to the 1394 host PC 4 by a 1394 interface bus. The 1394 LINK 12 is connected to the 1394 PHY 11, has a link layer function, and manages and controls the data and packets received and transmitted by the 1394 PHY.

The SCSI circuit 13 is connected to the SCSI device 5 by a SCSI bus and controls the transfer of data to and from the SCSI device 5.

The control circuit 17 includes an MPU (central and first to fifth processors) 14, a direct memory access (DMA) controller 15, and a memory 16. The MPU 14 is connected to the 1394 LINK 12, the SCSI circuit 13, the DMA controller 15, and the memory 16. Further, the MPU 14 controls and monitors the 1394 LINK 12, the SCSI circuit 13, the DMA controller 15, and the memory 16 in accordance with a program stored in the memory 16.

The memory 16 temporarily stores the data that flows through the 1394 LINK 12, the MPU 14, and the SCSI circuit 13. During normal data transfer, the DMA controller 15 transfers data directly between the 1394 LINK 12 and the SCSI circuit 13 and does not transfer data by way of the MPU 14.

Figure 7:
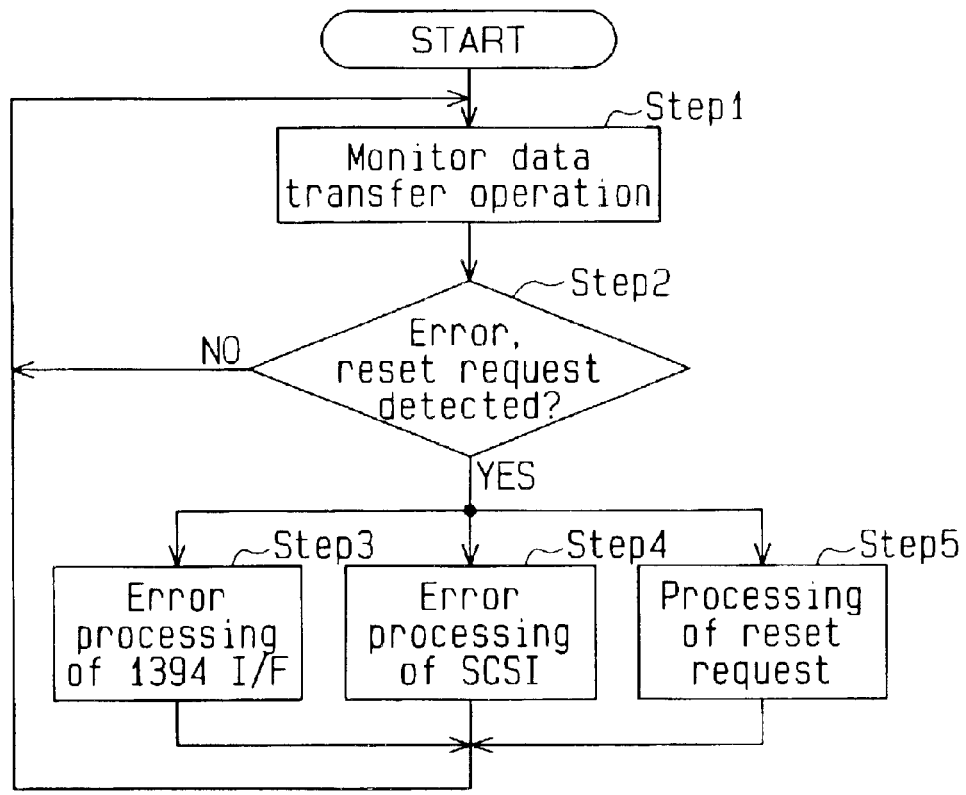
FIGS. 7 to 13 are flowcharts illustrating the processing performed by the interface converter of FIG. 6.

FIG. 7 illustrates the process performed by the control circuit 17 (MPU 14) when an error occurs during data transfer in the interface converter 10.

During data transfer, the control circuit 17 monitors the operation of the 1394 PHY 11, the 1394 LINK 12, and the SCSI circuit 13 in step 1. When the control circuit 17 detects the occurrence of an error in the IEEE 1394 interface in step 2, the control circuit 17 processes the error of the IEEE 1394 interface (first process) in step 3. When the control circuit 17 detects the occurrence of an error in the SCSI in step 2, the control circuit 17 processes the error of the SCSI (second process) in step 4. When the control circuit 17 detects a reset request generated by the 1394 host PC in step 2, the control circuit 17 processes the reset request (third process) in step 5.

[Error Processing Performed When Error is Detected in the IEEE 1394 Interface]

The process of step 3 will now be discussed with reference to FIG. 8. When detecting an error in the IEEE 1394 interface, the control circuit 17 selects the process of steps 6 to 8 or the process of steps 9 and 10 in accordance with the content of the error.

In step 6, when an error is detected, the control circuit 17 suspends the transfer of data to the SCSI device 5 and notifies the 1394 host PC of the error (step 7). Then, the control circuit 17 waits for an instruction from the 1394 host PC (step 8) to end the error process. The processes of steps 6 to 8 are similar to the processes performed by the prior art interface converter 50.

In step 9, the control circuit 17 transmits or receives the packet at which an error occurred during data transfer once more. If the data is transferred normally, the control circuit 17 restarts normal data transfer from the following packet (step 10) and ends the error processing.

[Error Processing Performed When Error is Detected in the SCSI]

The process of step 4 will now be discussed with reference to FIG. 9. When detecting an error in the SCSI, the control circuit 17 selects the process of steps 11 to 13 or the process of steps 14 to 16 in accordance with the content of the error.

Figure 1:
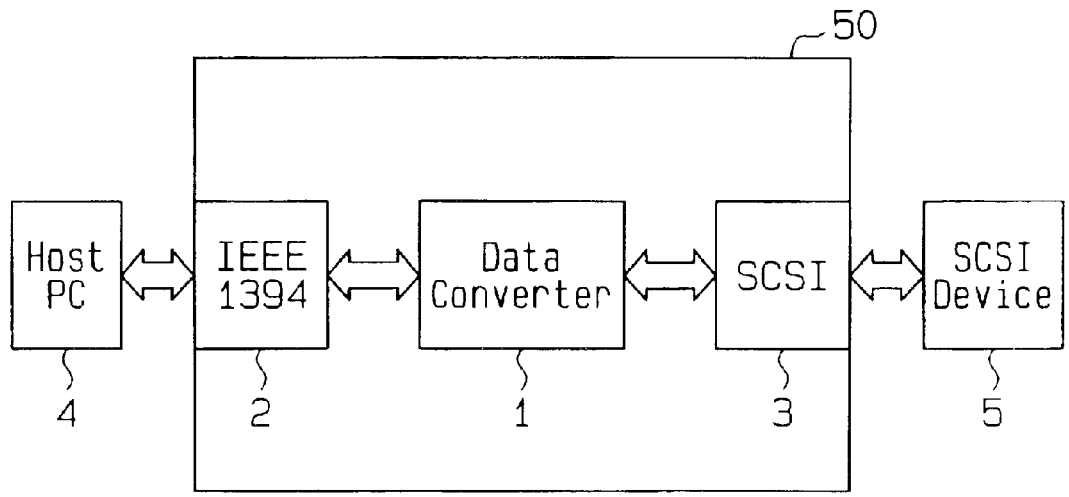
FIG. 1 is a schematic block diagram of a prior art interface converter.
Figure 2:
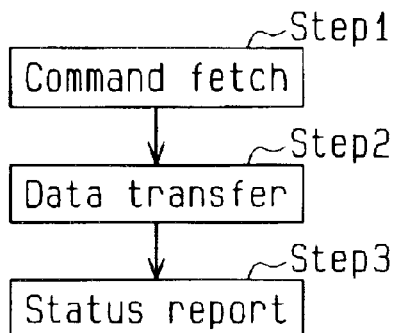
FIG. 2 is a flowchart illustrating a data transfer operation performed by the interface converter of FIG. 1.
Figure 3:
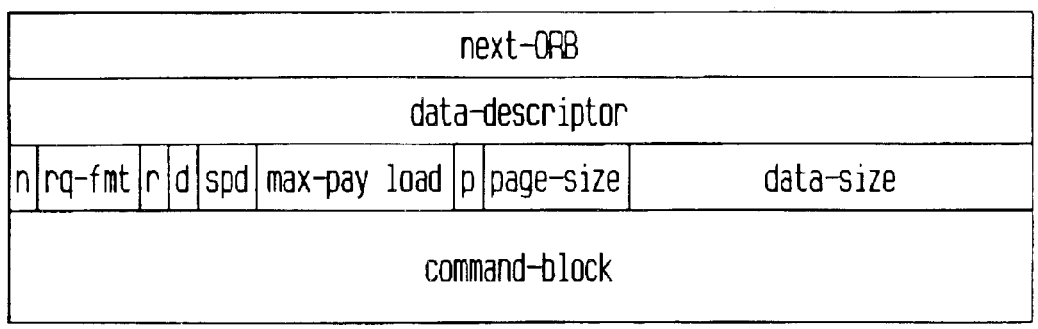
FIG. 3 is an explanatory diagram of a prior art command ORB.
Figure 4:
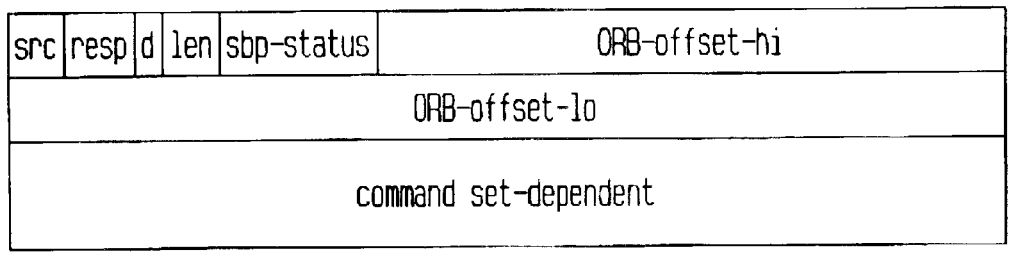
FIG. 4 is an explanatory diagram of a prior art status block.
Figure 5:
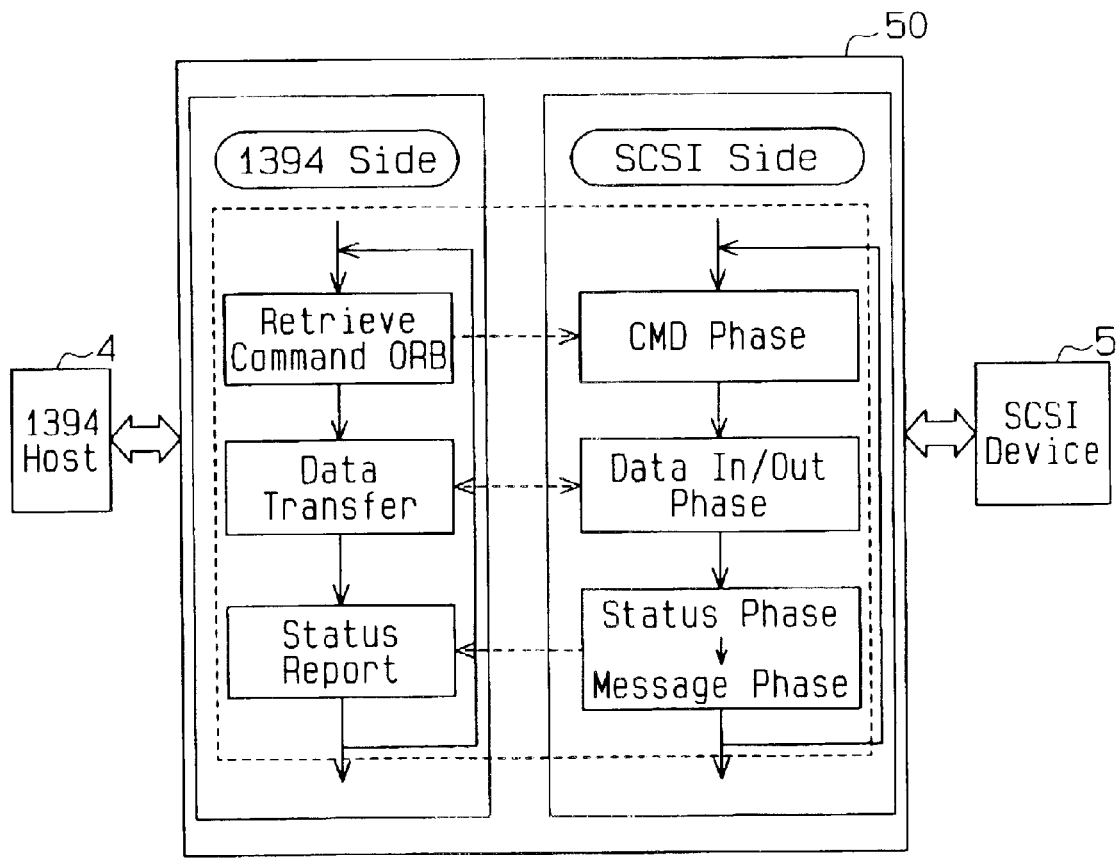
FIG. 5 is an explanatory diagram illustrating the operation of a prior art IEEE 1394 interface circuit and a SCSI circuit.

In step 11, when an error is detected, the control circuit 17 suspends the transfer of data to a SCSI target device and notifies the 1394 host PC of the error in accordance with the status FIFO format of FIG. 4 (step 12). Then, the control circuit 17 waits for an instruction from the 1394 host PC (step 13) to end the error process. The processes of steps 11 to 13 are similar to the processes performed by the prior art interface converter 50.

In step 14, when an error is detected, the control circuit 17 suspends the transfer of data to the SCSI device 5 in the same manner as in step 11.

Then, the control circuit 17 provides the SCSI device 5 again with the command that was suspended in step 14 or provides the SCSI device 5 with a command for the section that is to be used subsequent to the suspension of the data transfer (step 15). In accordance with the command provided in step 15, the control circuit 17 restarts the transfer of data (step 16) and ends the error processing.

[Processing Performed When Reset Request is Provided From the 1394 PC 4]

The process of step 5 will now be discussed with reference to FIG. 7. When the 1394 host PC 4 provides the interface converter 10 with a reset request, the control circuit 17 selects the process of steps 17 to 19 or the process of steps 20 and 21 in accordance with the content of the request from the 1394 host PC 4 (content of a management ORB).

When the content of the management ORB is one of abort task, abort task set, logical unit reset, target reset, and logout, the control circuit 17 performs the process of steps 17 to 19.

In accordance with the management ORB, the control circuit 17 ends the transfer of data with the SCSI device 5 in step 17 and sends a response packet of the management ORB to the 1394 host PC 4 in step 18. Then, the control circuit 17 waits for the next instruction from the 1394 PC 4 in step 19.

If the content of the management ORB received from the 1394 host PC 4 is one other than those described above, the control circuit 17 sends a response packet of the management ORB to the 1394 host PC 4 in step 20 and restarts the data transfer in step 21.

[Suspension of the Transfer of Data to the SCSI Device 5]

Figure 11:
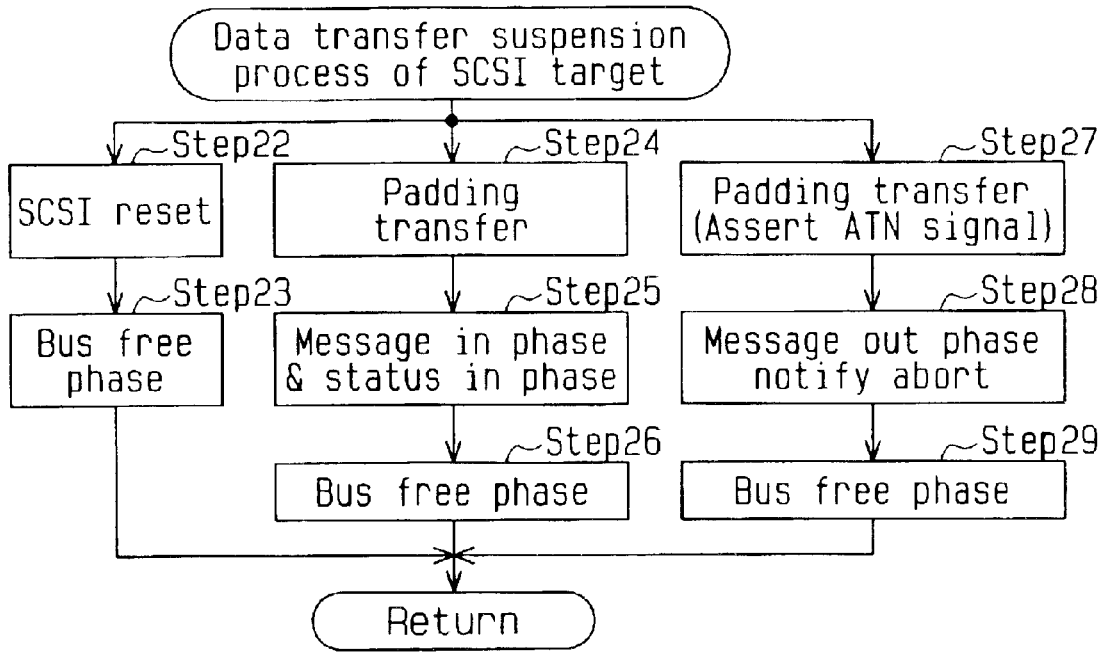

FIG. 11 illustrates the contents of the data transfer suspension process in steps 6, 11, and 17. In the process for suspending the transfer of data to the SCSI device 5, the control circuit 17 selects the process of steps 22 and 23, the process of steps 24–26, or the process of steps 27 to 29 in accordance with the content of the error or the content of the reset request from the 1394 host PC 4.

In step 22, the control circuit 17 resets the SCSI device 5. In step 23, the control circuit 17 sets the SCSI device 5 to a bus free phase. The processing of steps 22 and 23 is similar to the processing performed by the prior art interface converter 50.

In step 24, the control circuit 17 starts data transfer (padding transfer) with dummy data and ends the data transfer corresponding to the command. When the control circuit 17 receives a command complete response in a message IN phase and a good response in a status IN phase, the control circuit 17 confirms the completion of data transfer in step 25. The control circuit 17 confirms that the SCSI device 5 is in the bus free phase in step 26 and ends the data transfer suspension process.

In step 27, the control circuit 17 asserts an ATN (attention) signal and starts data transfer with dummy data (padding transfer) and ends the data transfer corresponding to the command. Then, when the SCSI device 5 enters a message OUT phase, the control circuit 17 sends an abort signal to the SCSI device 5 in step 28. The control circuit 17 confirms that the SCSI device 5 is in the bus free phase in step 29 and ends the data transfer suspension process.

[Contents of Processing Performed When a Command is Received from the 1394 Host PC 4]

Figure 12:
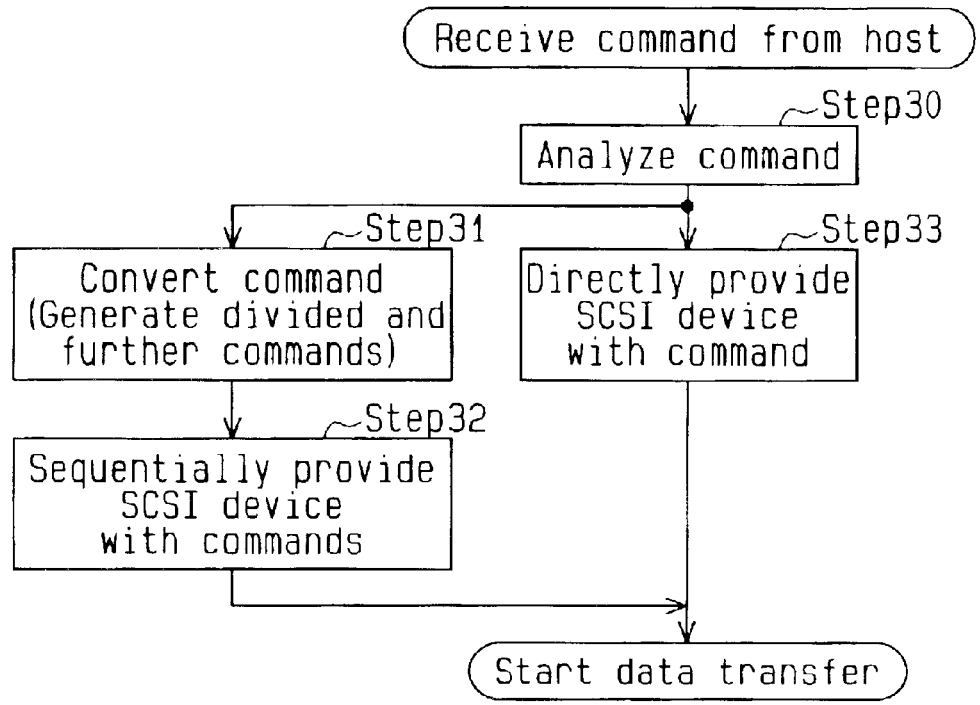

FIG. 12 shows a process performed by the control circuit 17 when the interface converter 10 receives a command from the 1394 host PC 4. When the interface converter 10 receives a command from the 1394 host PC 4, the control circuit 17 analyzes the type of command or transfer data amount of the received command ORB packet (step 30).

The control circuit 17 then selects the process of steps 31 and 32 or the process of step 33 in accordance with the content of the received command and the capacity of the SCSI device 5 or the 1394 host PC 4.

In step 31, the control circuit 17 divides the received command to decrease the amount of transfer data per command. Alternatively, the control circuit 17 generates an substitute command to decrease the transfer data amount per command.

Then, in step 32, the control circuit 17 sequentially provides the substitute command to the SCSI device 5 and proceeds to the data transfer process. In step 33, the control circuit 17 provides the analyzed command directly to the SCSI device 5 without processing the analyzed command.

[Contents of Processing Performed When the SCSI Device 5 is Provided With a Command]

Figure 13:
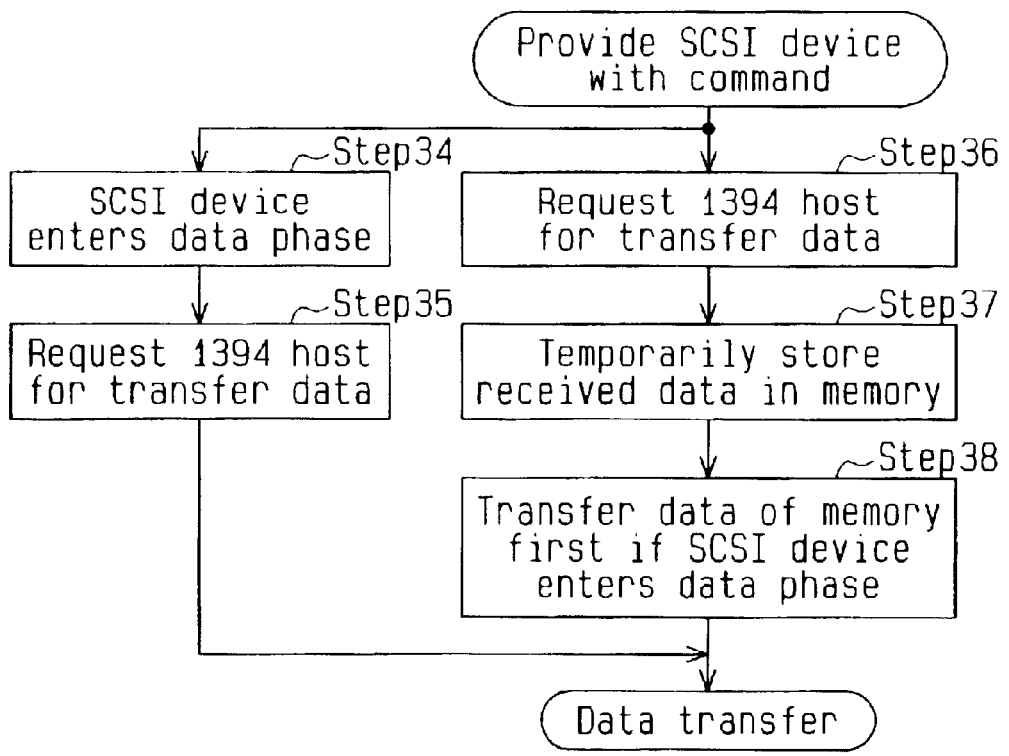

FIG. 13 illustrates the processing performed by the control circuit 17 when the interface converter 10 provides the SCSI device 5 with a command to start the transfer of data. In accordance with the capacity of the SCSI device 5, the control circuit 17 selects the process of steps 34 and 35 or the process of steps 36 to 38.

In step 34, after providing the SCSI device 5 with a command, the control circuit 17 requests the 1394 host PC 4 for the transfer of data when detecting that the SCSI device 5 has entered the data phase SCSI device 5 and starts the data transfer.

In step 36, after providing the SCSI device 5 with a command, the control circuit 17 immediately requests the 1394 host PC 4 for the transfer of data. The control circuit 17 then temporarily stores the data transferred from the 1394 host PC 4 in step 37. When the SCSI device 5 enters the data phase, the control circuit 17 transfers the data stored in the memory 16 to the SCSI device 5 in step 38 before performing the data transfer.

Figure 14:
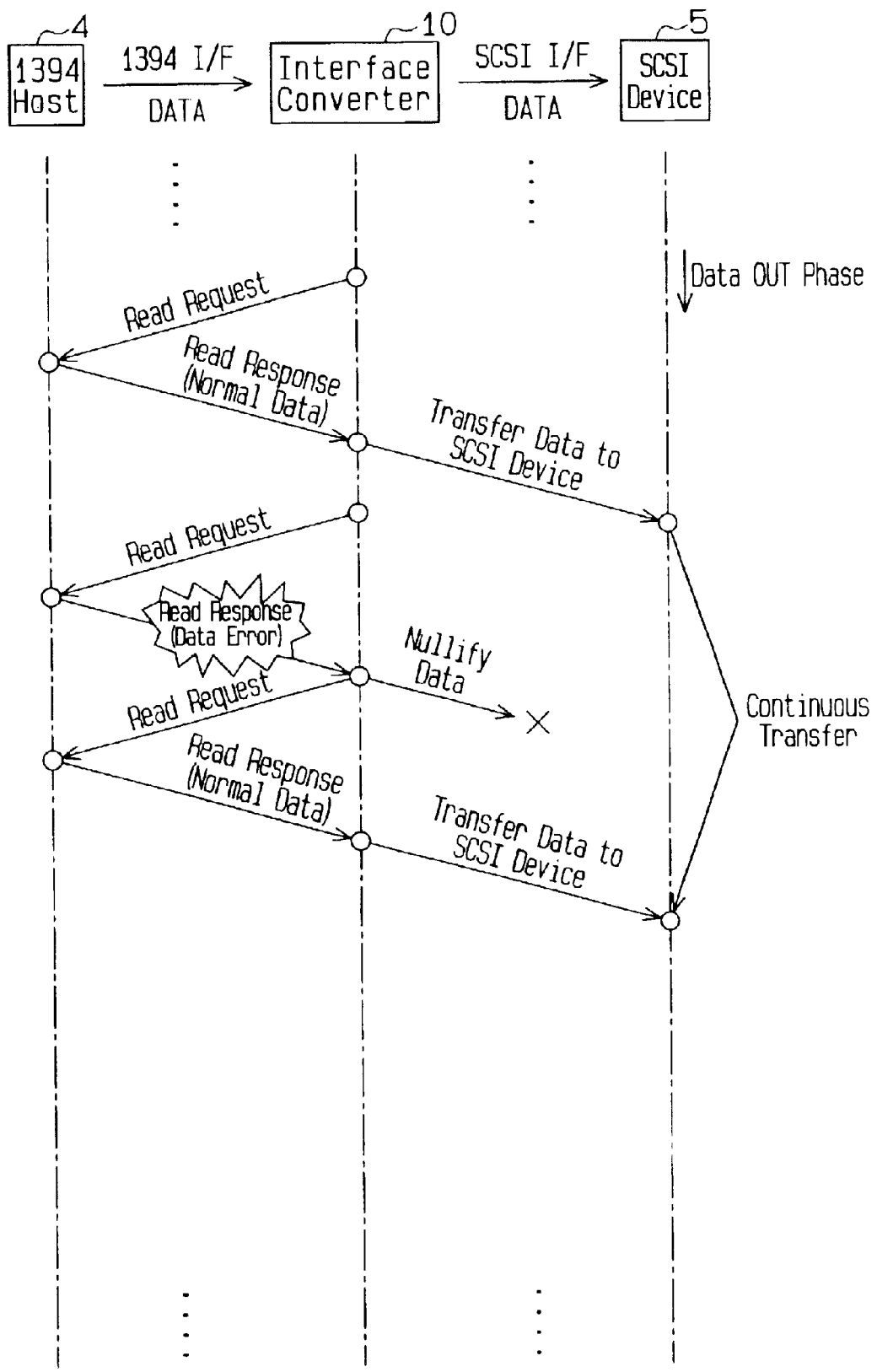
FIGS. 14 to 20 are explanatory diagrams illustrating the operation of the interface converter of FIG. 6.

The operation of the interface converter 10 will now be discussed. FIG. 14 illustrates an error process performed in steps 9 and 10 when data is transferred from the 1394 host PC 4 to the SCSI device 5. In accordance with a read request signal from the interface converter 10 to the 1394 host PC 4, data is transferred in packets from the 1394 host PC to the SCSI device 5 via the DMA controller 15. In this state, the SCSI device 5 is in the data OUT phase.

When an error is detected in the data transferred from the 1394 host PC 4 to the interface converter 10, the control circuit 17 nullifies the packet that includes the error and provides the 1394 host PC 4 again with a read request signal of the same data. If the re-transmitted data is normal, the control circuit 17 transfers the retransmitted data to the SCSI device 5. The control circuit then returns to the normal data transfer process.

Figure 8:
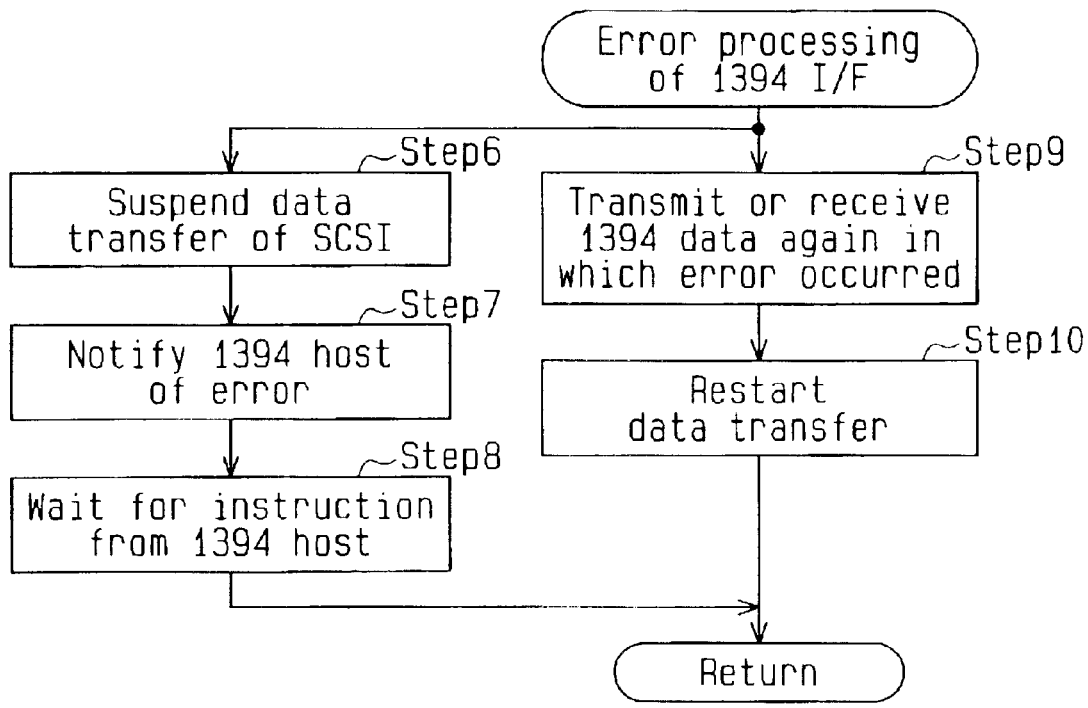
Figure 15:
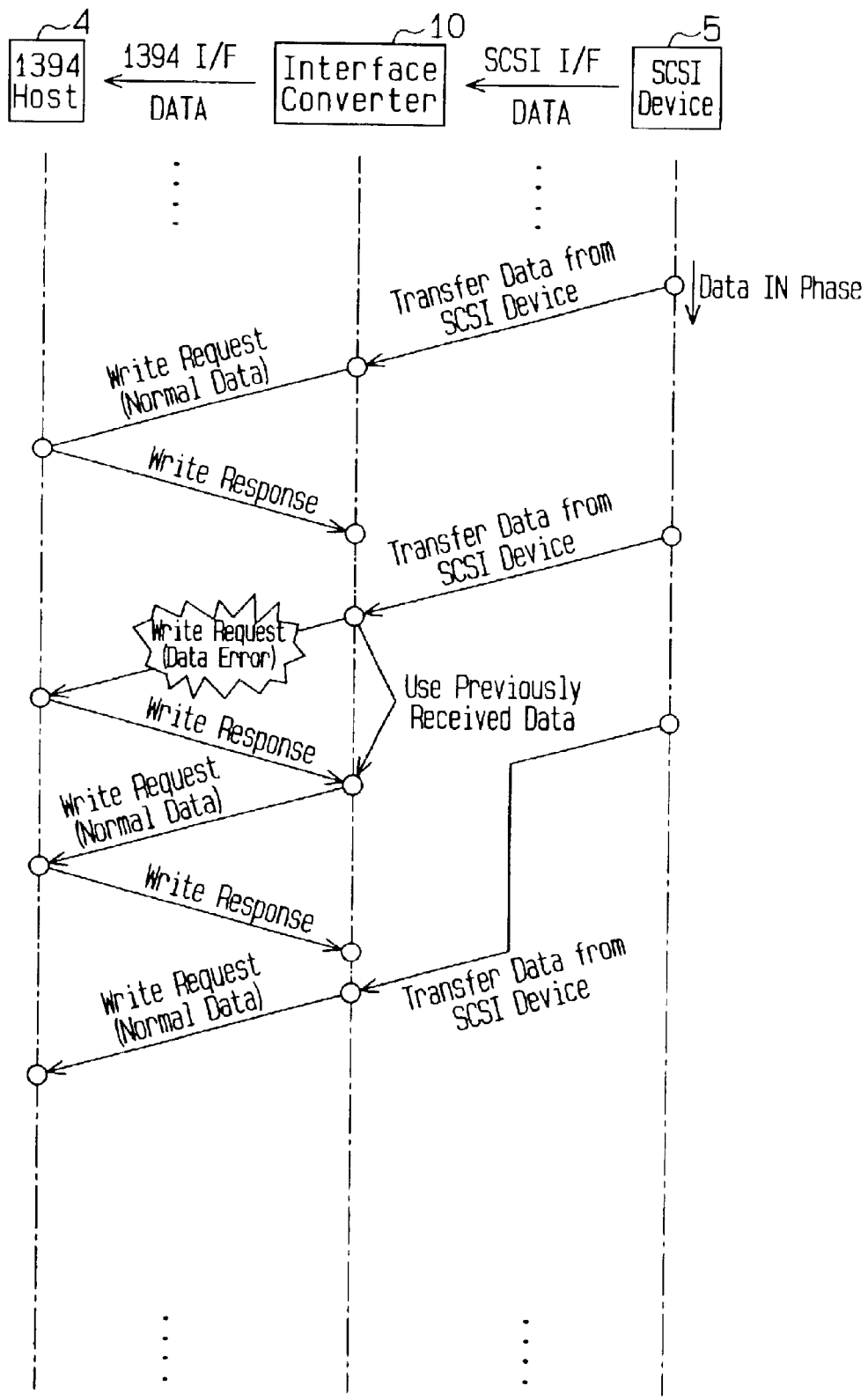

FIG. 15 illustrates the error processing performed when data is transferred from the SCSI device 5 to the 1394 host PC 4 in steps 9 and 10 of FIG. 8. Data is transferred from the SCSI device 5, which is in the data IN phase, to the interface converter 10. The interface converter 10 provides the 1394 host PC 4 with a write request and transfers data to the 1394 host PC 4. In this state, the transfer data is transferred via the DMA controller 15.

When data 1394 is transferred normally to the 1394 host PC 4, the 1394 host PC 4 provides the interface converter 10 with a write response signal. The DMA controller 15 holds the previously transferred data until the write response signal is provided.

If an error occurs in the IEEE 1394 interface when the interface converter 10 transfers data to the 1394 host PC, the control circuit 17 reads from the DMA controller 15 the same data as the data of the packet in which the error occurred. The read data is re-transferred (transferred again) to the 1394 host PC 4.

In this state, the transfer of data from the SCSI device 5 to the interface converter 10 is not interrupted. If the re-transference of data to the 1394 host PC 4 is successful, data transfer is continued.

Figure 9:
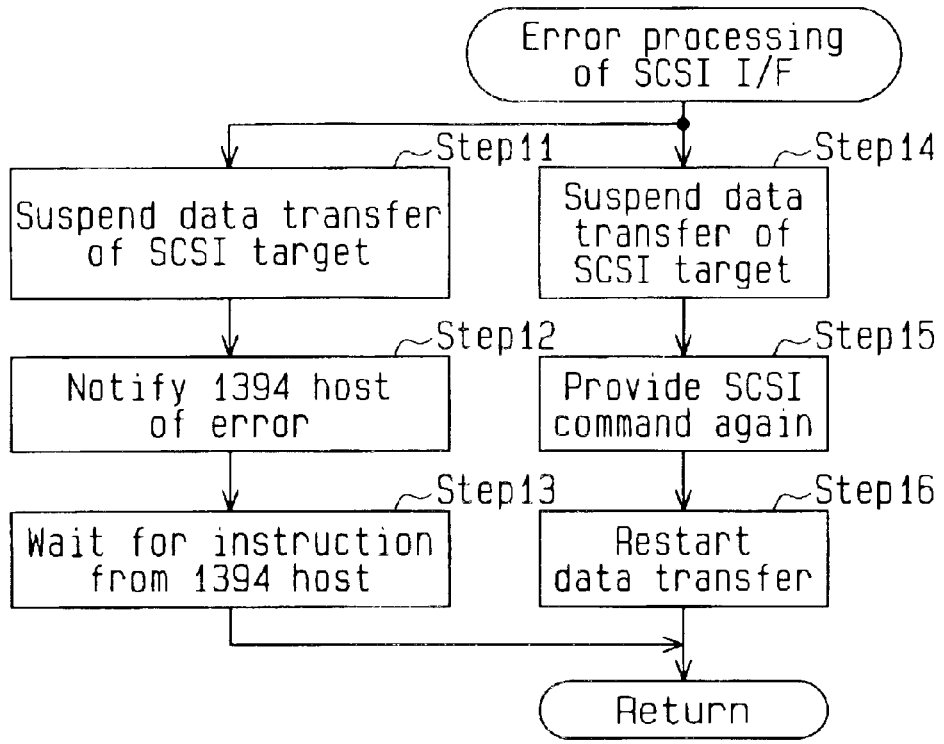
Figure 16:
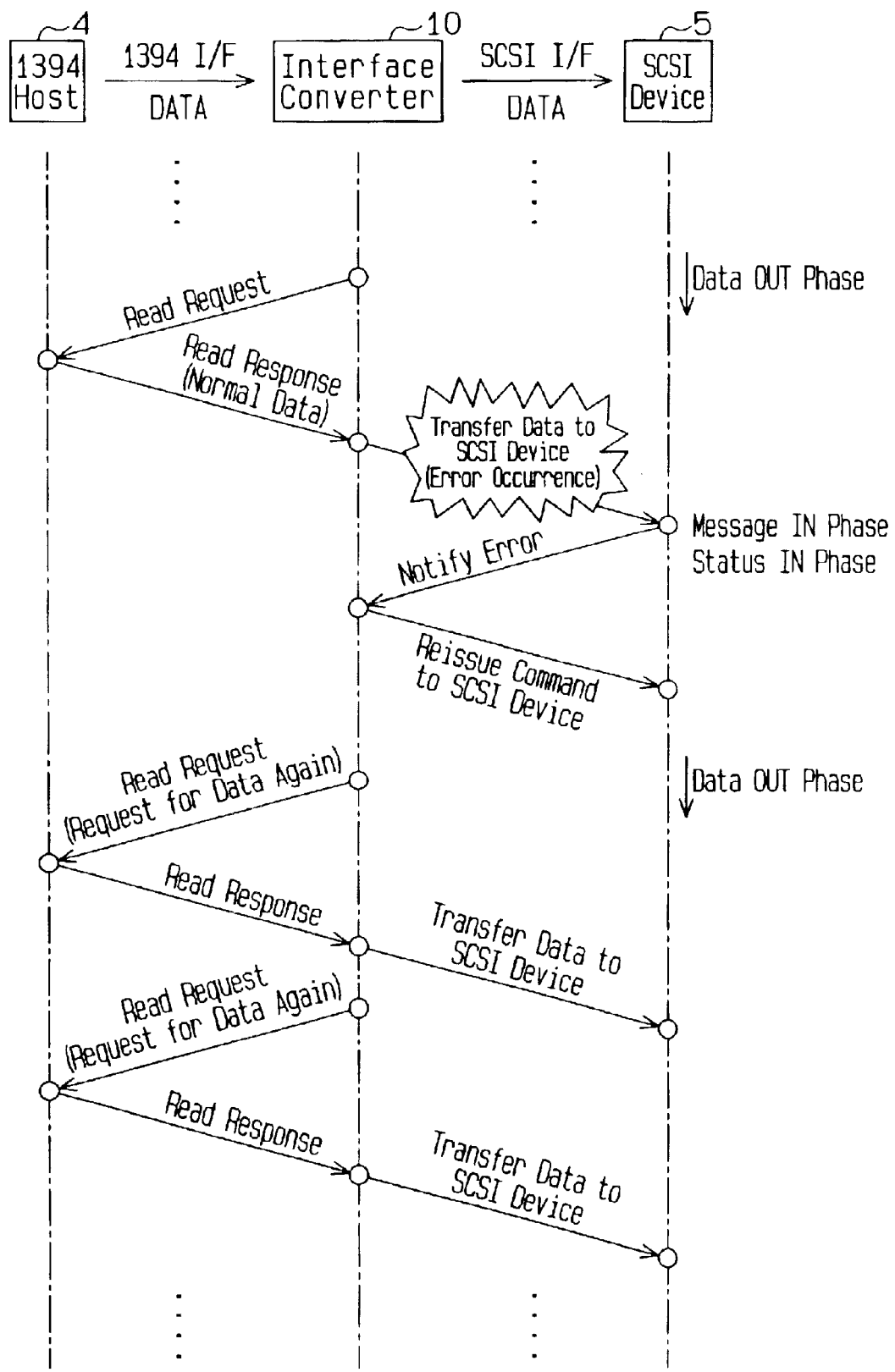

FIG. 16 illustrates the error processing performed when data is transferred from the 1394 host PC 4 to the SCSI device 5 in steps 14 to 16 of FIG. 9. In response to a read request signal from the interface converter 10 to the 1394 host PC 4, data is transferred in packets from the 1394 host PC 4 to the SCSI device 5 via the DMA controller 15. In this state, the SCSI device 5 is in the data OUT phase.

When an error is detected in the data at the SCSI, the control circuit 17 suspends data transfer without notifying the 1394 host PC 4 of the error and suspends the transfer of data. The control circuit 17 provides the SCSI device 5 again with a command to execute the transfer process. Further, the control circuit 17 provides the 1394 host PC 4 with a read request signal and starts the transfer of data to the SCSI device 5 from the beginning in response to the command.

Figure 17:
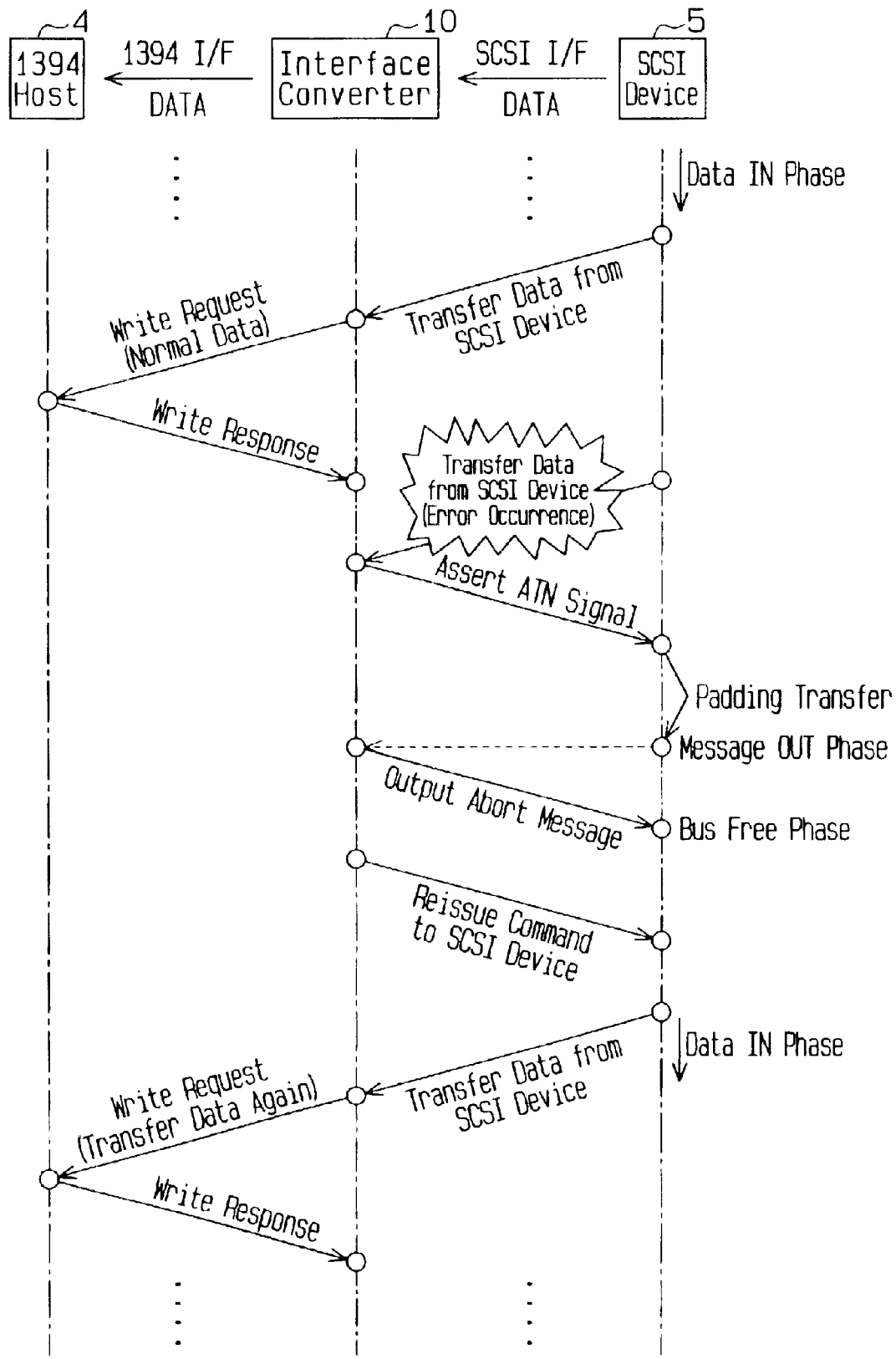

FIG. 17 illustrates the error processing performed when data is transferred from the SCSI device 5 to the 1394 host PC 4 in steps 14 to 16 of FIG. 9. Data is transferred from the SCSI device 5, which is in the data IN phase to the interface converter 10. The interface converter 10 sends a write request signal to the 1394 host PC 4 and transfers the data to the 1394 host PC 4. When the data is properly transferred to the host PC 4, the 1394 host PC 4 provides the interface converter 10 with a write response signal.

If an error is detected in the SCSI when data is transferred from the SCSI device 5 to the 1394 host PC 4, the control circuit 17 does not notify the 1394 host PC 4 of the error. The control circuit 17 performs the processing of steps 27 to 29 of FIG. 11 and asserts the ATN signal to the SCSI device 5.

The control circuit 17 performs the reading of the remaining data (padding transfer) that corresponds to the execution command from the SCSI device 5 and causes the SCSI device 5 to enter the message OUT phase. As the SCSI device 5 enters the message OUT phase, the control circuit 17 provides the SCSI device 5 with an abort message. The SCSI device 5 suspends the command that is being executed and enters the bus free phase. In this state, the control circuit 17 provides the SCSI device 5 again with the execution command generated when the error occurred and restarts the transfer of data from the SCSI device 5 to the 1394 host PC 4.

Figure 10:
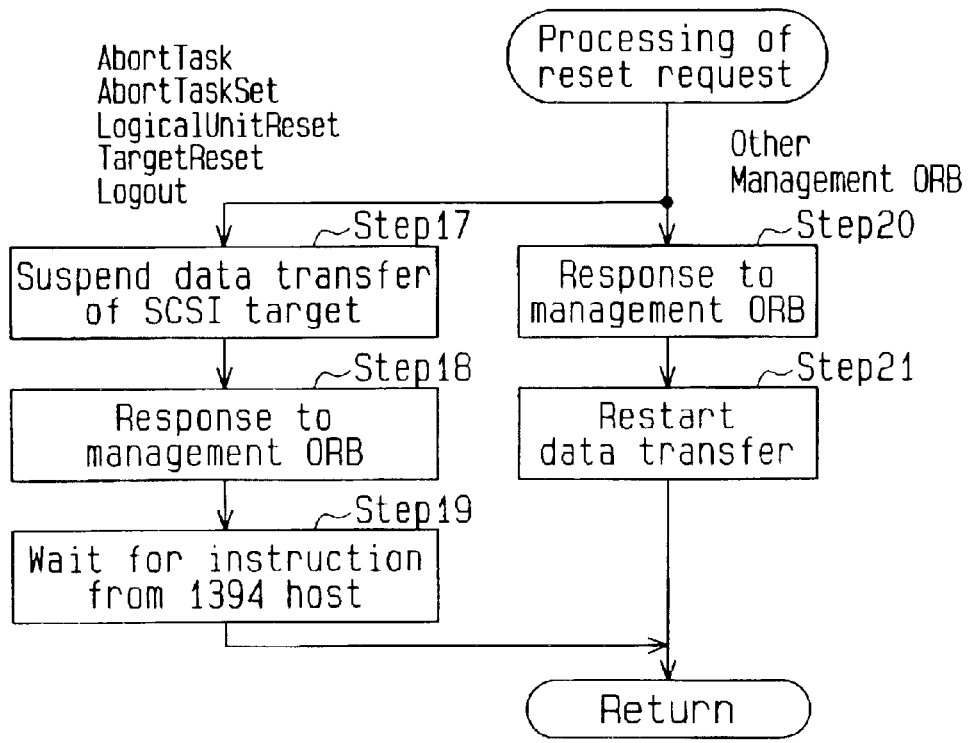
Figure 18:
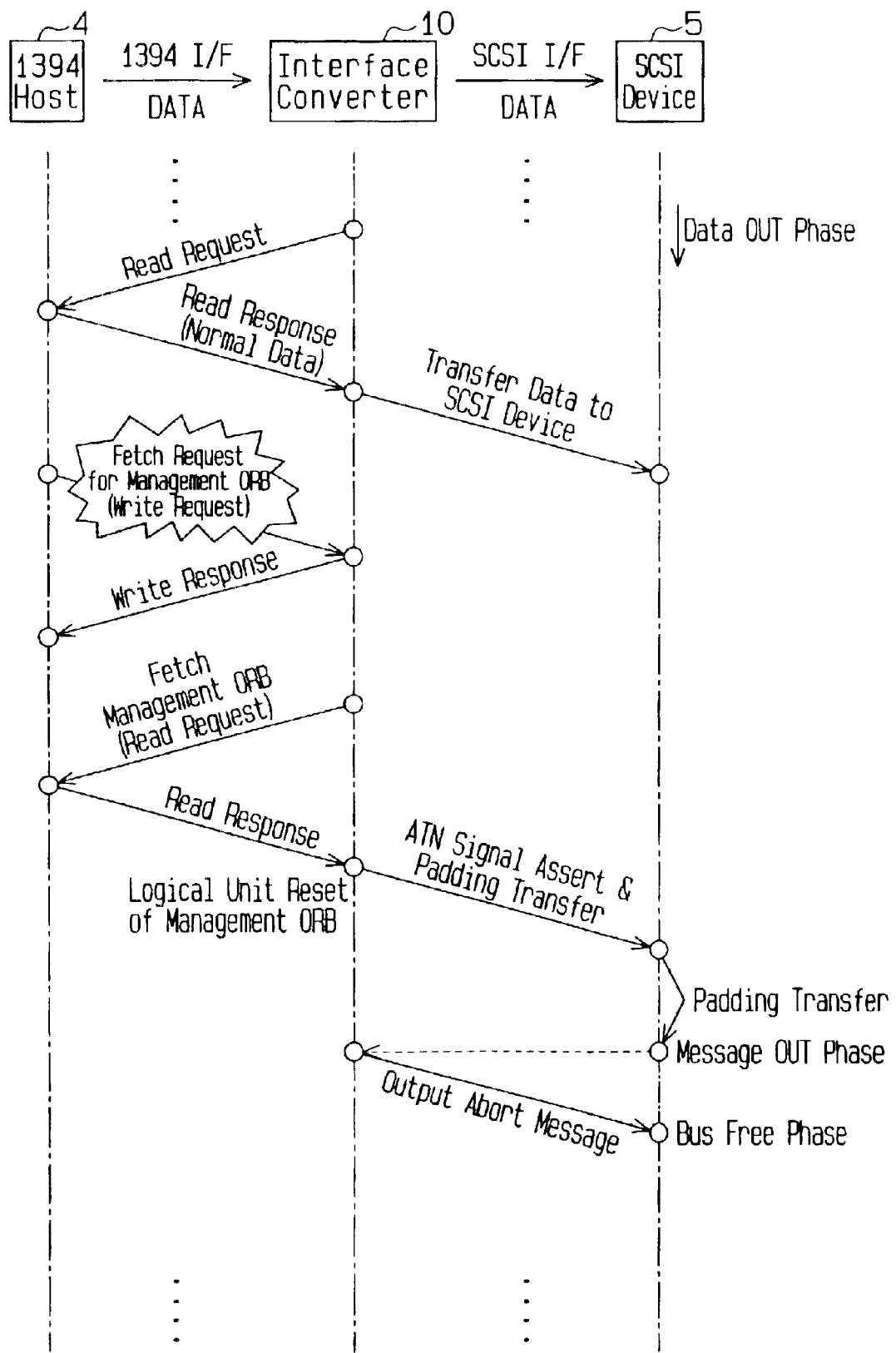

FIG. 18 illustrates the processing performed when the 1394 host PC 4 provides the interface converter 10 with a logical unit reset management ORB in steps 17 to 19 of FIG. 10. If the 1394 host PC 4 provides the interface converter 10 with a fetch request (write request) of the logical unit reset management ORB when data is transferred from the 1394 host PC 4 to the SCSI device 5, the control circuit 17 fetches the management ORB (read request, read response) in response to the fetch request (write response).

Then, without resetting the SCSI device 5, the control circuit 17 asserts the ATN signal to the SCSI device 5 as shown in steps 27 to 29 of FIG. 11 and performs padding transfer with the SCSI device 5. After the SCSI device 5 enters the message OUT phase, the control circuit 17 provides the SCSI device 5 with the abort signal and causes the SCSI device 5 to enter the bus free phase. Then, the transfer process is returned to a normal state.

Figure 19:
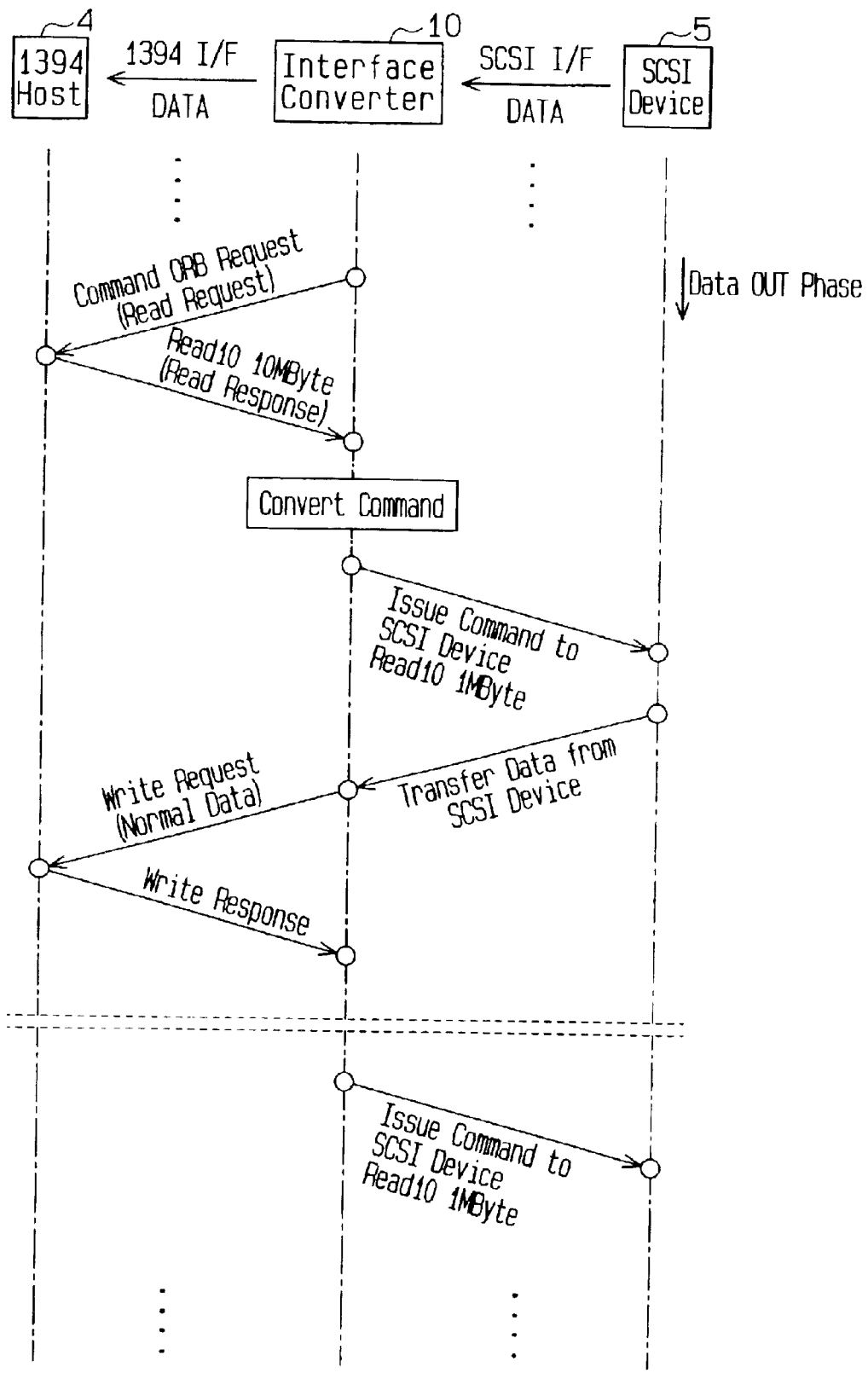

FIG. 19 illustrates how data is transferred from the SCSI device 5 to the 1394 host PC 4 in steps 30 to 32 of FIG. 12. The control circuit 17 receives a command ORB from the 1394 host PC and converts the command. For example, if the content of a command is a Read10 command having a transfer amount of 10 Mbytes, the control circuit 17 divides the Read10 command into ten commands, each having a transfer amount of 1 Mbyte.

The control circuit 17 sequentially provides the SCSI device 5 with the divided commands and repeats the data transfer process. Commands having a large transfer amount are executed after being divided into commands having a small transfer amount.

Figure 20:
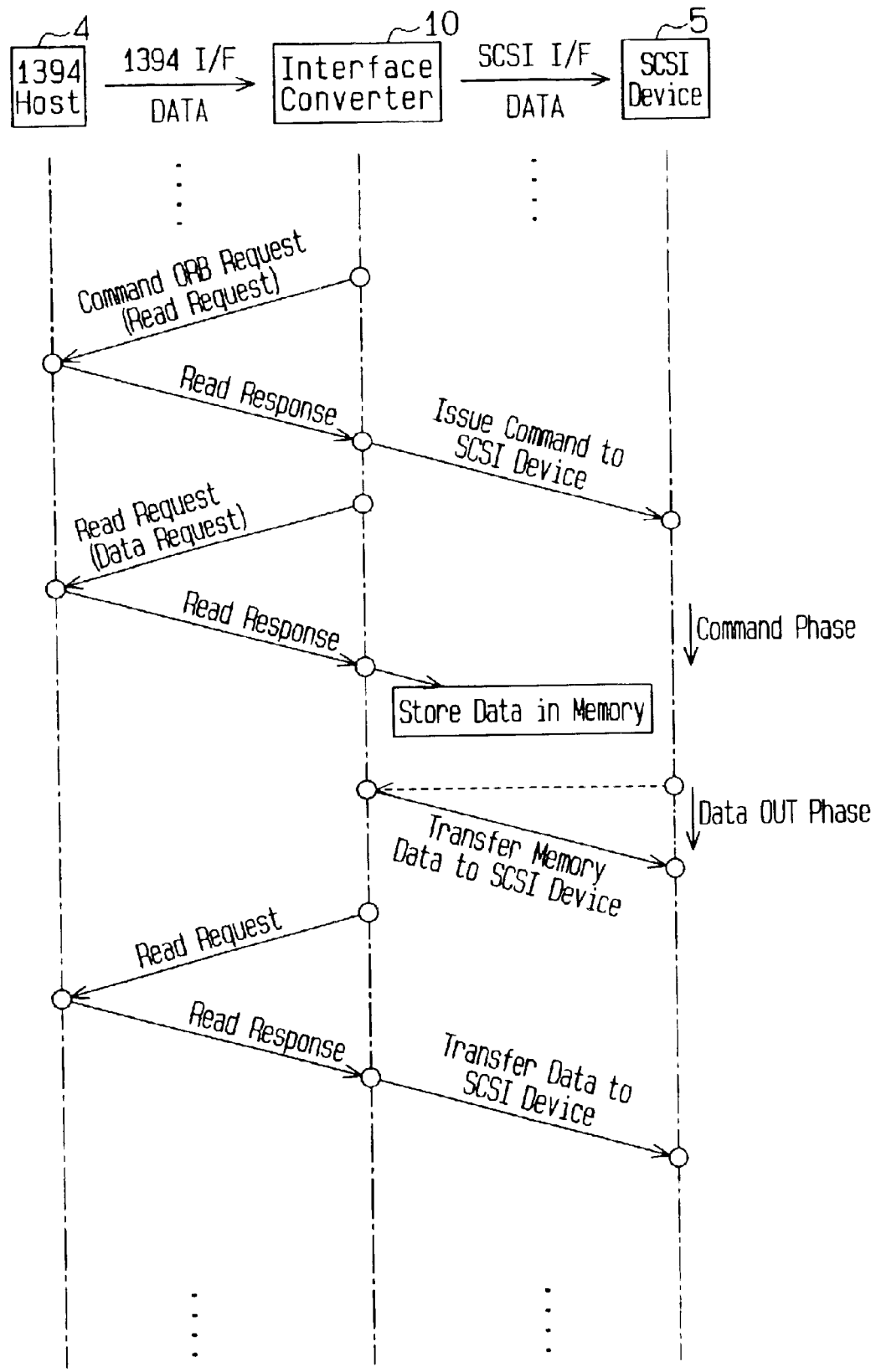

FIG. 20 illustrates how data is transferred from the 1394 host PC 4 to the SCSI device 5 in steps 36 to 38 of FIG. 13. The control circuit 17 receives a command ORB from the 1394 host PC 4 and provides the command to the SCSI device 5. The control circuit 17 stores the data read from the 1394 host PC 4 in the memory 16 until the SCSI device 5 enters the data OUT phase from the command phase. After the SCSI device 5 enters the data OUT phase, the control circuit 17 first transfers the data stored in the memory 16 to the control circuit 17 and then proceeds to normal data transfer.

Accordingly, when the transition of the SCSI device 5 from the command phase to the data OUT phase is delayed, the 1394 PC 4 does not determine whether the processing of the SCSI device 5 is erroneous. Thus, the reading of data from the 1394 host PC 4 is performed without any delays.

The interface converter 10 has the advantages described below.

(1) Referring to FIG. 14, when data is transferred from the 1394 host PC 4 to the SCSI device 5, the 1394 host PC 4 is not notified of errors that occur in the IEEE 1394 interface. Data that is the same as the data in which the error occurred is re-transmitted from the 1394 host PC 4 to the SCSI device 5, and the transfer of data to the SCSI device 5 is continued. Accordingly, since the processing, which is based on a command, does not have to be performed from the beginning, the data transfer efficiency is improved.

(2) Referring to FIG. 15, when transferring data from the SCSI device 5 to the 1394 host PC 4, the 1394 host PC 4 is not notified of errors that occur in the IEEE 1394 interface. Data that is the same as the data in which the error occurred is re-transmitted from the DMA controller 15 to the 1394 host PC 4, and the transfer of data from the SCSI device 5 to the 1394 host PC 4 is continued. Accordingly, since the transfer of data continues without waiting for an instruction from the 1394 host PC 4, the data transfer efficiency is improved.

(3) Referring to FIG. 16, when data is transferred from the 1394 host PC 4 to the SCSI device 5, the 1394 host PC 4 is not notified of errors that occur in the SCSI. The interface converter 10 provides the SCSI device 5 with a command once more. Thus, the transfer of data from the 1394 host PC 4 to the SCSI device 5 is started again from the beginning. Accordingly, in comparison with the prior art in which data transfer is restarted after notifying the 1394 host PC 4 of an error and waiting for an instruction from the 1394 host PC 4 processing, the data transfer efficiency is improved.

(4) Referring to FIG. 17, when data is transferred from the SCSI device 5 to the 1394 host PC 4, the 1394 host PC 4 is not notified of errors that occur in the SCSI. The interface converter 10 provides the SCSI device 5 with a command once more. Thus, the transfer of data from the SCSI device 5 to the 1394 host PC 4 is started again from the beginning. Accordingly, in comparison with the prior art, the data transfer efficiency is improved.

(5) Referring to FIG. 18, the interface converter 10 returns to the normal operation without resetting the SCSI device 5 even when receiving a reset request of the SCSI device 5 during data transfer. Accordingly, the SCSI device 5 is quickly returned to normal operation, and the data transfer efficiency is improved.

(6) Referring to FIG. 19, a command having a large data transfer amount is divided into commands having a small data transfer amount. Accordingly, when a command is re-executed due to the occurrence of a data transfer error, the amount of data transferred in an overlapping manner is reduced. This improves the data transfer efficiency.

(7) Referring to FIG. 20, if the SCSI device 5 is not in the data OUT phase when data is transferred from the 1394 host PC 4 to the SCSI device 5, the data read from the 1394 host PC 4 is temporarily stored in the memory 16. The stored data is transferred to the SCSI device 5 when the SCSI device 5 enters the data OUT phase. This prevents the occurrence of an error and improves the data transfer efficiency.

(8) When an error occurs during data transfer, an error recovery process is performed without waiting for an instruction from the 1394 host PC 4. This improves the data transfer efficiency.

(9) The processing related with the IEEE 1394 interface of the 1394 host PC 4 and the processing related with the SCSI of the SCSI device 5 is controlled independently from each other. This eliminates problems caused by the difference in capacity between the 1394 host PC 4 and the SCSI device 5.

(10) When an error occurs in the IEEE 1394 interface or the SCSI, re-executed commands are minimized. This improves the data transfer efficiency.

(11) The error recovery process of an error that occurred in the IEEE 1394 interface is performed without notifying the SCSI. Further, the error recovery process of an error that occurred in the SCSI is performed without notifying the IEEE 1394 interface.

(12) During normal data transfer, data is transferred through the DMA controller 15 but not through the MPU 14. This improves the data transfer speed.

It should be apparent to those skilled in the art that the present invention may be embodied in many other specific forms without departing from the spirit or scope of the invention. Particularly, it should be understood that the present invention may be embodied in the following forms.

A plurality of the SCSI devices 5 may be connected to the interface converter 10 to transfer data between the 1394 host PC 4 and the selected target SCSI device 5.

The present examples and embodiments are to be considered as illustrative and not restrictive, and the invention is not to be limited to the details given herein, but may be modified within the scope and equivalence of the appended claims.

What is claimed is:

1. A method for transferring data between a host device connected to the IEEE 1394 interface and a SCSI device connected to the SCSI in accordance with a predetermined execution command, wherein the SCSI has a message OUT phase and a bus free phase, the method comprising the steps of:

transferring the data from the SCSI device to the host device;

asserting an attention signal when the data error occurs in the SCSI during the step of transferring the data;

providing the attention signal to the SCSI device;

performing a padding transfer in accordance with the attention signal by the SCSI device;

causing the SCSI device to enter the message OUT phase;

generating an abort signal for causing the SCSI device to enter the bus free phase and providing the abort signal to the SCSI device;

providing an execution command related with the data error to the SCSI device again; and starting the transfer of data related with the execution command from the beginning.

2. A method for transferring data between a host device connected to the IEEE 1394 interface and a SCSI device connected to the SCSI in accordance with a predetermined execution command, wherein the SCSI has a message OUT phase and a bus free phase, the method comprising the steps of:

transferring the data from the host device to the SCSI device;

asserting an attention signal when a reset request for resetting the SCSI device is generated by the host device;

providing the attention signal to the SCSI device;

performing a padding transfer to the SCSI device;

causing the SCSI device to enter the message OUT phase;

generating a abort signal for causing the SCSI device to enter the bus free phase and providing the abort signal to the SCSI device; and causing the SCSI device to return to a normal operation without resetting the SCSI device.

* * * * *

UNITED STATES PATENT AND TRADEMARK OFFICE
CERTIFICATE OF CORRECTION

| | |
|---|---|
| PATENT NO. | : 6,948,025 B2 |
| APPLICATION NO. | : 10/211290 |
| DATED | : September 20, 2005 |
| INVENTOR(S) | : Yuji Yoshida |

Page 1 of 1

It is certified that error appears in the above-identified patent and that said Letters Patent is hereby corrected as shown below:

Column 13, Line 2, delete "a" and insert -- an -- therefor.

Signed and Sealed this

Eighteenth Day of July, 2006

JON W. DUDAS
*Director of the United States Patent and Trademark Office*